United States Patent [19]

Doddington et al.

[11] Patent Number: 5,500,828
[45] Date of Patent: Mar. 19, 1996

[54] APPARATUS, SYSTEM AND METHODS FOR DISTRIBUTED SIGNAL PROCESSING

[75] Inventors: George D. Doddington, McLean, Va.; Basavaraj Pawate, Dallas; Shivaling Mahant-Shetti, Richardson, both of Tex.; Derek Smith, Lafayette, La.

[73] Assignee: Texas Instruments Incorporated, Dallas, Tex.

[21] Appl. No.: 474,602

[22] Filed: Jun. 7, 1995

Related U.S. Application Data

[62] Division of Ser. No. 68,908, May 28, 1993.

[51] Int. Cl.⁶ ................................................. G11C 13/00
[52] U.S. Cl. ..................................... 365/230.03; 365/205
[58] Field of Search ........................ 365/230.01, 230.03, 365/189.01

[56] References Cited

U.S. PATENT DOCUMENTS 5,452,260   9/1995   Matsui et al. ...................... 365/230.03

*Primary Examiner*—Terrell W. Fears
*Attorney, Agent, or Firm*—Douglas A. Sorensen; Richard L. Donaldson; William E. Hiller

[57] ABSTRACT

An active memory 14 is provided which includes a data memory 20 including rows and columns of storage locations for holding data and computational results. A broadcast memory 22 includes rows and columns of storage locations for holding control instructions. Computing circuitry 26 is provided which is operable to perform a first computational operation using first and second words of data retrieved from the data memory 20 and perform a second computational operation using a result from the first operation and a result from a previous operation. Control circuitry 24 is operable in response to control instructions received from broadcast memory 22 to control the transfer of the first and second words of data from the data memory 20 to said computing circuitry 26 and the performance of the first and second operations.

2 Claims, 2 Drawing Sheets

APPARATUS, SYSTEM AND METHODS FOR DISTRIBUTED SIGNAL PROCESSING

This is a Divisional of application Ser. No. 08/068,908, Filed: May 28, 1993, Title: Apparatus, Systems and Methods for Distributed Signal Processing

NOTICE (C) Copyright, *M* Texas Instruments Incorporated, 1993. A portion of the Disclosure of this patent document contains material which is subject to copyright protection. The copyright and mask work owner has no objection to facsimile reproduction by anyone of the patent document or the patent disclosure, as it appears in the U.S. Patent and Trademark Office, patent file or records, but otherwise reserves all rights in its copyright and mask work whatsoever.

CROSS-REFERENCE TO RELATED APPLICATIONS

The following coassigned patents and applications are hereby incorporated herein by reference:

U.S. patent application Ser. No. 068909, Attorney Docket No. 32350-714, entitled "Apparatus, Systems and Methods for Distributed Processing", filed May 28, 1993;

U.S. patent application Ser. No. 69308, Attorney Docket No. 32350-715, entitled "Apparatus, Systems and Methods for Implementing A Memory Embedded Search Arithmetic Logic Unit", filed May 28, 1993; and U.S. patent application Ser. No. 069048, Attorney Docket No. 32350-716, entitled "Devices, Systems and Methods for Implementing a Kanerva Memory", filed May 28, 1993.

TECHNICAL FIELD OF THE INVENTION

The present invention relates in general to data processing and in particular to apparatus, systems and methods for distributed signal processing.

BACKGROUND OF THE INVENTION

As the tasks computing systems are required to perform increase in complexity, the burdens on the central processing unit (CPU), the size of the system memory, and the traffic on the system address and data buses all correspondingly increase. In particular, many types of tasks associated with matrix mathematics, speech synthesis, image signal processing, and digital signal processing are computationally intensive, often requiring the execution of a large number of basic arithmetic operations before a final result is obtained. For example, calculation of dot products is often required in digital signal processing applications. The calculation of a dot product requires the performance of number of multiplications and additions, each of which in conventional processing systems must be performed by the system central processing unit. In addition, the resulting intermediate sums and products must be stored and retrieved from memory as the operations proceed. Thus, the CPU becomes burdened not only with the task of performing all arithmetic operations but also with the task of controlling the transfer of data to and from memory. The memory in turn must be large enough to handle the initial raw data and all the intermediate results. Finally, even if multiple CPUs are used, the traffic on the associated address and data buses is substantial as addresses, data and results are exchanged.

Thus, the need has arisen for apparatus, systems and methods which more efficiently handle computationally intensive applications. Such apparatus, systems and methods, should ease CPU task burdens, minimize the amount of memory required and efficiently use bus bandwidth. Further, such apparatus, systems and methods should be compatible with currently available device and system configurations.

SUMMARY OF THE INVENTION

An active memory is provided which has a data memory including rows and columns of storage locations for holding data and computational results. A broadcast memory is also provided which includes rows and columns of storage locations for holding control instructions. Computing circuitry is included which is operable to perform a first computational operation using first and second words of data retrieved from the data memory and perform a second computational operation using a result from the first operation and a result from a previous operation. Control circuitry operable in response to control instructions received from the broadcast memory controls the transfer of the first and second words of data from the data memory to the computing circuitry and the performance of the first and second operations.

The apparatus, systems and methods embodied in the concepts of the present invention provide for more efficient handling of computationally intensive applications. For example, systems employing active memory devices embodying the concepts of the present invention can implement a distributed processing. A distributed processing eases CPU task burdens, minimizes the amount of memory required and more efficiently uses bus band waves.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
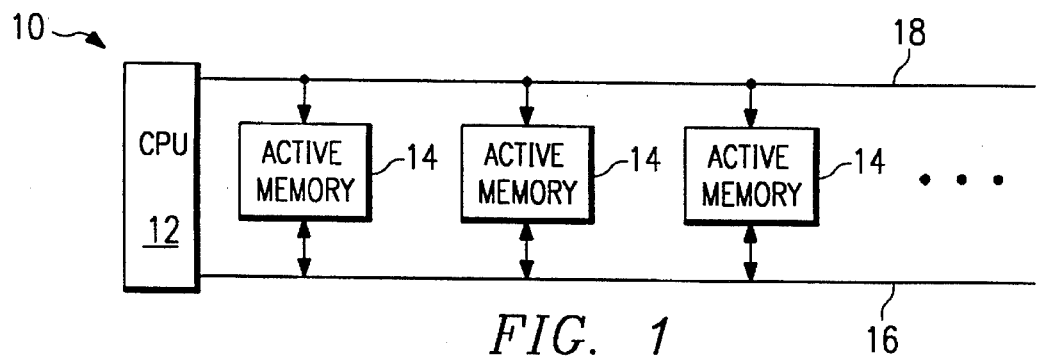
FIG. 1 is a block diagram of a data processing system embodying concepts of the present invention.
Figure 2:
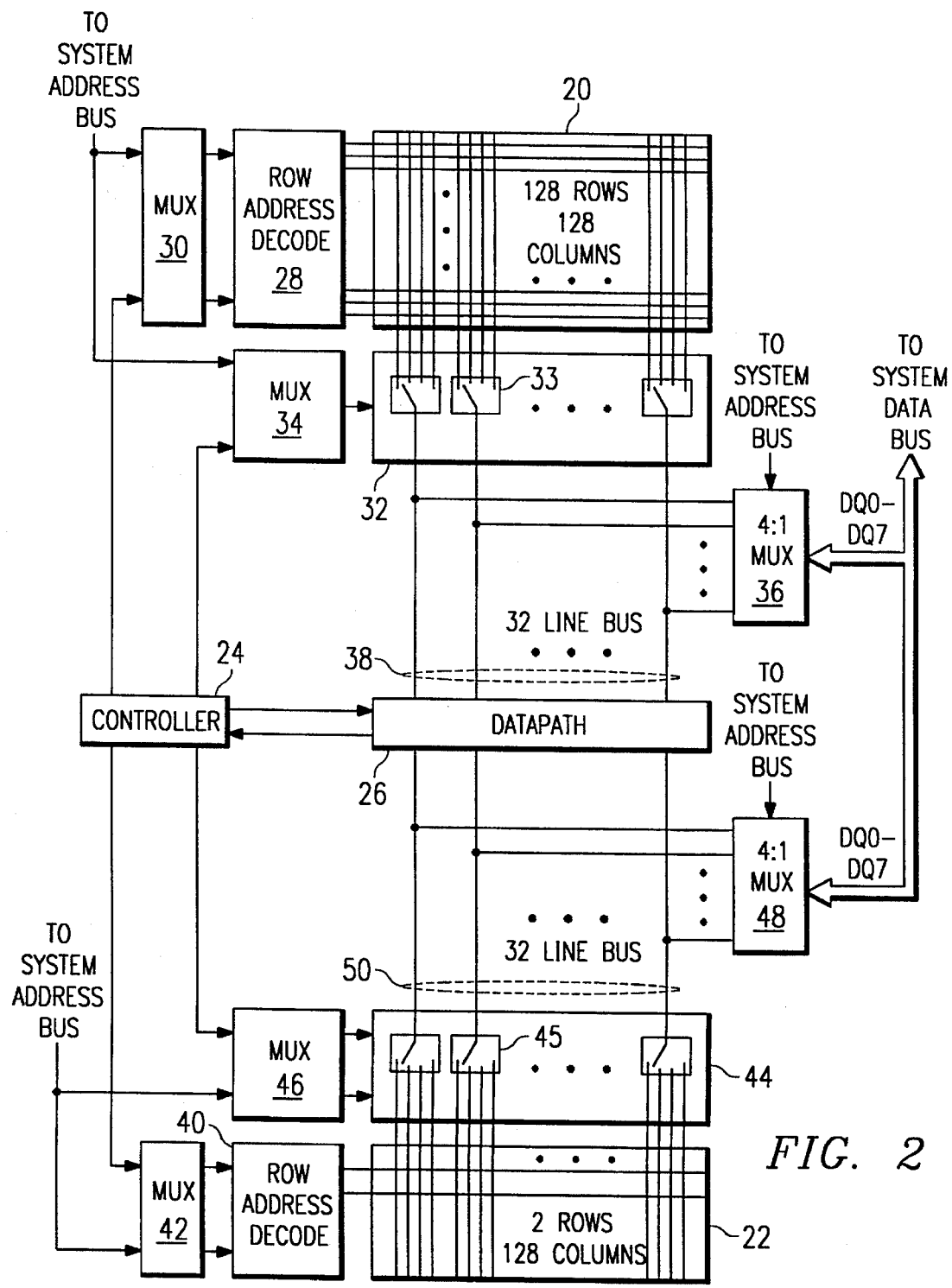
FIG. 2 is a functional block diagram of an embodiment of the active memory devices shown in FIG. 1.

The preferred embodiment of the present invention and its advantages are best understood by referring to FIGS. 1–2 of the drawings, like numerals being used for like and corresponding parts of the various drawings.

FIG. 1 depicts a processing system 10 employing an architecture embodying concepts of the present invention. Processing system 10 includes a central processing unit (CPU) 12 coupled to a number of active memory devices 14 by a data bus 16 and an address bus 18. In the architecture of FIG. 1, the primary system control and computational capabilities are provided by CPU 12 which may be for example a general purpose microprocessor, a microcontroller, a digital signal processor, or a graphics processor. In addition to providing the data and instruction storage required for general system operation, active memory devices 14 provide for the distributed computing and data handling required for problem solving operations, as discussed in detail below.

In the depicted embodiment of system 10, data intensive calculations, especially repetitive calculations such as those typically required during matrix operations and speech synthesis, are distributedly performed using the active memory devices 14. CPU 12 for example, may load a each active memory 14 device with a subset of the raw data required for a given problem. Each active memory 14 then proceeds to perform a given set of operations on the corresponding subset of data while the CPU 12 is free to simultaneously perform other tasks. When the tasks distributed to the active memories 14 are complete, CPU 12 retrieves the results to complete the solution to the problem. Preferably, each active memory 14 in system 10 has a pin configuration compatible with the pin configuration of a chosen conventional ("inactive") memory unit (for example a 28-pin pinout). In this fashion, active memories 14 and conventional inactive memories can be interchanged on a given board or other supporting structure.

In addition to minimizing the computation burdens imposed on CPU 12, distributed processing using active memory devices 14 allows for more efficient utilization of data bus 16 and address bus 18. In essence, active devices 14 compress or reduce data such that the exchange of raw data and intermediate results on data bus 16 and the corresponding transmission of addresses on address bus 18 are substantially reduced.

FIG. 2 is a functional block diagram of an illustrative active memory 14 embodying the concepts of the present invention. Active memory 14 may be constructed as a single chip or module (a "device") which includes a data random access memory 20 (RAM), a broadcast RAM 22, a controller 24 and datapath 26. In a single chip embodiment, data RAM 20 and broadcast RAM 22 may be fabricated in a standardized configuration for a given set of devices while controller 24 and datapath 26 are customized to meet the operational requirements for a given device or subset of devices.

Data RAM 20 may be either a static random access memory (SRAM) or a dynamic random access memory array (DRAM). In FIG. 2, RAM 20 is depicted as a 2k×8 memory arranged as 128 rows and 128 columns of RAM cells. It should be noted that in addition to the configuration shown in FIG. 2, any one of a number of alternate RAM architectures may also be used, as is understood in the art. Associated with data RAM 20 is circuitry for reading and writing data to and from selected cells in the array including row address circuitry 28, a row address multiplexer 30, first stage decoding (column address) circuitry 32, column address multiplexer 34 and input/output circuitry 36. Multiplexer 30 passes address bits to the row address circuitry 28 from either system address bus 18 or from the controller 24. The selection can be made in response to either a discrete signal or the value of the address itself. Similarly, multiplexer 34 passes address bits from either the address bus 18 or from controller 24. Multiplexers 30 and 34 along with input/output circuitry 36 allow for the transfer of bits of data into the cells of data RAM either from CPU 12 using data bus 16 and address bus 18 or from datapath 26 using internal bus 38.

In the embodiment of FIG. 2, first stage decoder 32 through multiplexers 33 multiplexes each set of four adjacent bitlines to form an internal bus 38 which is 32 bits wide (if for example a 256 column memory architecture was used, then the internal bus would be 64 bits wide). In the illustrated embodiment, I/O circuitry 36 operates as a 4:1 multiplexer which selects, in response from address bits from address bus 18, one of four sets of eight adjacent bits on 32-bit internal bus 38 for communication to the system data bus 16. It should be noted that in alternate embodiments the configuration of input/output circuitry may vary depending on such factors as the width of internal bus 38 and the number of lines (bits) communicating with system data bus 16.

Broadcast RAM 22 may also be either static or dynamic and is similarly associated with circuitry for writing and reading data into and out of its memory cells array including row address circuitry 40, row address multiplexer 42, first stage (column) decoding circuitry 44, multiplexer 46 and input/output circuitry 48. In FIG. 2, broadcast RAM is organized as 2 rows and 128 columns, although alternate row/column organizations may be used in other embodiments. The read/write circuitry associated with broadcast RAM 22 operates similar to the read/write circuitry associated with data RAM 20. First stage decoder circuitry 44 in the illustrated embodiment through multiplexers 45 performs 4:1 multiplexing on each four adjacent columns of the 128 columns memory cells in broadcast RAM 22 with selected 32 bits coupled to datapath 26 via a second internal bus 50. Multiplexers 42 and 46 selectively pass address bits from either system address bus 18 or from controller 24. Thus, multiplexers 42 and 46 along with input/output circuitry 48 allow for the transfer of data into the cells of broadcast RAM 26 from either CPU 12 via or from controller 24 through datapath 26.

As with the corresponding circuitry associated with data RAM 20, the specific configurations of row address circuitry 40, multiplexers 42 and 46, first stage decode circuitry 44, and input/output circuitry 48 will vary based on such factors as the numbers of rows and columns in the cell array of broadcast RAM 22, the width of internal bus 50, the number of bits being received from the system address bus 18 and the number of bits (lines) communicating with the system data bus 14. The coupling of data bus 16 with input/output circuitry 36 associated with data RAM 20 and input/output circuitry 48 associated with broadcast RAM 22 is preferably made through a single set of pins (D∅–D7) to provide compatibility with conventional memory pinouts. Similarly, the coupling of the read/write circuitry associated with both data RAM 20 and broadcast RAM 22 may be made through a single set of pins (also not shown). Since active memories 14 are part of the system memory, it is preferable that memories 14 take on the characteristics of memory chips. In other words, Memories 14 should be efficient like memory chips, small in size and relying on a minimum number of data and address pins which are compatible with the pin configurations of conventional ("inactive") memory chips.

Datapath 26 under the control of controller 24 routes data on internal buses 38 and 50 and provides the desired distributed computational capabilities. Datapath 26 may be implemented in random logic, in programmable gate array circuitry, or in programmable logic array circuitry, as required to customize the chip or unit to perform the desired computational functions. For example, datapath 26 may include adders and multipliers to implement the matrix multipliers example or comparator circuitry in speech applications. Further, both controller 24 and datapath 26 may together be implemented in digital signal processing circuitry, such as that found in the Texas Instruments TI-320 family of digital signal processors.

In the preferred embodiment of system 10, each broadcast RAM 22 is placed at the highest address space available for the corresponding number of address bits received by active memories 14 from system address bus 18 This allows each broadcast RAM 22 to be written to or read from without a chip select signal. Further, all the broadcast RAMs 22 of the active memories 14 in system 10 can be accessed simultaneously. The broadcast Ram 22 for a given memory 14 receives instructions and data from CPU 12 on data bus 16 for use by controller 26 in carrying out a selected computation.

In a typical computation, CPU 12 writes data into the data Ram 20 of each active memory 14 from data bus 16. Typically each data RAM 20 holds a different subset of an overall set of data being operated on. For example, in the case of a matrix multiplication, each data RAM 20 might hold the data for a corresponding row in the matrices involved. A control sequence to be followed by each controller 24 is presented on data bus 16 while the high address bits are presented on address bus 18 such that the control sequence is written into each broadcast RAM 22. similarly, at least one argument (vector) of the desired computation being performed by system 10 is written into each broadcast RAM 22. Typically, the same vector is written into all the broadcast RAMs 22 in system 10.

In one embodiment, a dummy location in the broadcast memory space initiates execution of the arguments by the controller 24 and datapath 26 of each active memory device 14. In particular, controller 24 causes datapath 26 to apply the arguments retrieved from the broadcast RAM 22 to each row of data from data RAM 20, as dictated by the control sequence. The results from applying the arguments to a given row of data in the respective data RAM 20 are written by controller 24 through datapath 26 back into one or two selected byte locations along the same row. Controller 24 cycles through all row addresses and through the all addresses to the 4 to 1 multiplexer of data RAM first stage decoder 32 such that all the data in the data RAM 20 has been operated on.

Figure 3:
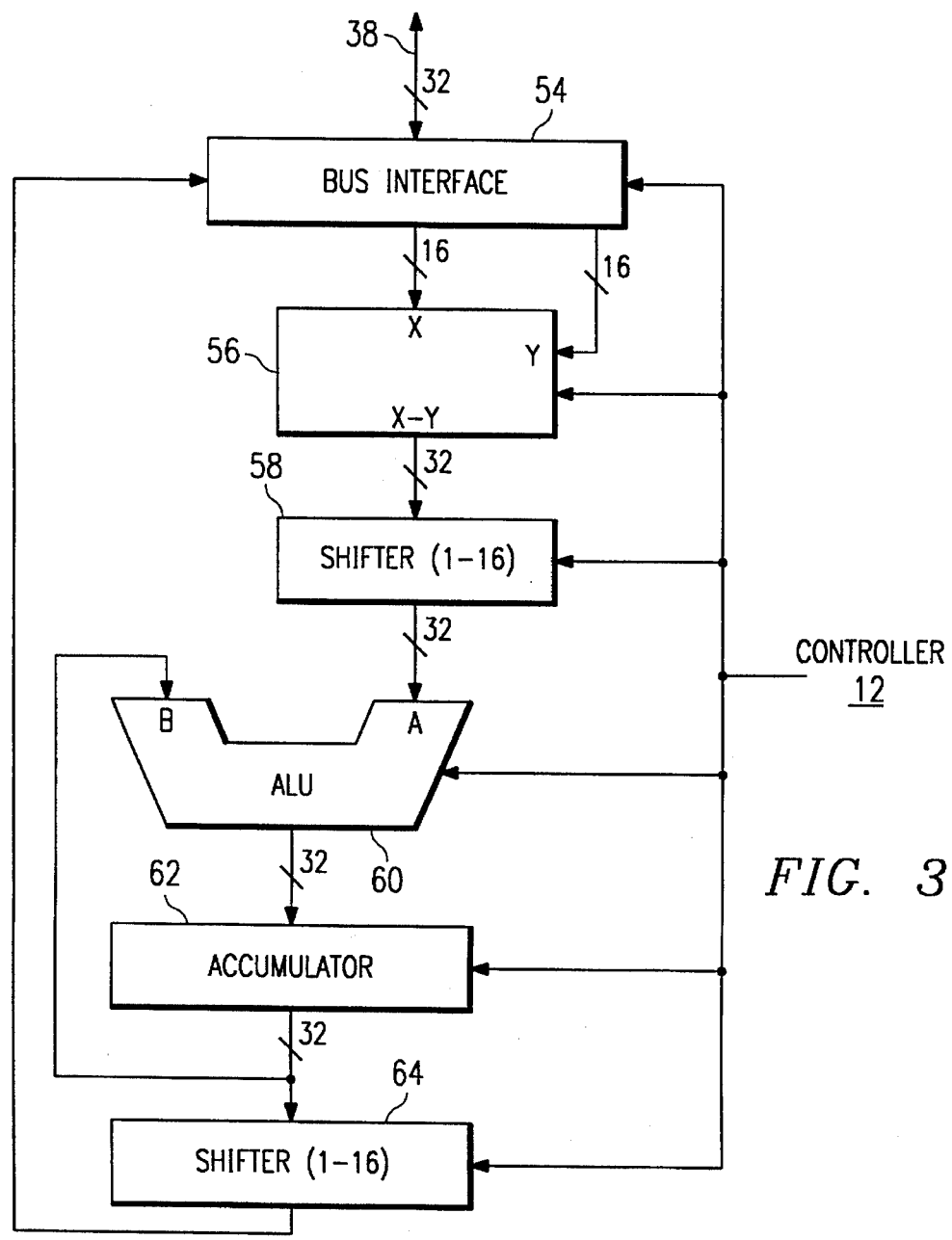
FIG. 3 is a functional block diagram of an embodiment of the computing circuitry of the active memory devices shown in FIG. 2.

One type of computing circuitry which may be implemented in controller 24 and datapath 26 is the multiply—accumulate circuitry 52 depicted in FIG. 3. Multiply—accumulate circuitry 52 is useful in such applications as the calculation of dot products according to the formula:

$$\sum_{i=1}^{n} X_{ij} * Y_{ik} \text{ where } j=1,\ldots,J \text{ and } k=1,\ldots K$$

In the embodiment of FIG. 3, each sixteen bits on internal bus 38 are respectively coupled through bus interface 54 to the X and Y inputs of multiplier 56. The 32-bit output of multiplier is presented to a 1 to 16 bit shifter 58. Since in many digital signal applications the first terms in the series calculation (i.e. the $X_1$ and $Y_1$ terms) are less than one, shifter 58 may be used to normalize the output of multiplier to reduce the number of leading edge zeroes. The postshifter 32 bits are then provided at the A output to arithmetic logic unit (ALU) 60. Arithmetic logic unit 60 in addition to performing basic arithmetic operations such as adding and subtracting may also be provided with the capability to increment, decrement, and performing logic operations such as AND and OR. The 32-bits output from ALU 60 are fed into accumulator 62, which may be divided into a 16-bit high register and a 16-bit low register. Accumulator 62 and ALU 60 are pipelined such that the result of the current operation performed by ALU 60 is entered into accumulator 62 while the stored result of the previous operation performed by ALU 60 is fed back to the B input of ALU 60. The output of ALU 60 is also pipelined to shifter 64. Shifter 64 provides for the selection of the 16 significant bits for output back to data RAM 20 via bus interface 54 and internal bus 38.

In a multiply-accumulate operation, two 16-bit words taken from a given row in data RAM 20 are provided by first stage decode circuitry 32 via internal bus 32 and then multiplied by multiplier 56 and provided to the B input of ALU 60. The results of multiplication are then added to results of the previous multiplication/addition presented at the B input from accumulator 62. For efficiency, the 16 significant result bits selected by shifter are sent back to locations in the same row in data RAM 20. As the series calculations proceed, data is retrieved row by row with the results correspondingly written back into data RAM 20 row by row.

In addition to the holding the control sequence upon which controller 24 directs the multiply—accumulate calculations, broadcast RAM also receives and stores data defining the specific operation of multiply/accumulate circuitry of datapath 26. For example, instructions words defining how many $X_{ij}$ and $Y_{ik}$ terms are to be multiplied and added, and the 16 bits to be selected by shifter 64 may be stored in broadcast RAM for use by controller 24.

While the active memory devices are operating on the data previously written into each of the data RAMs 20, CPU 12 is freed to attend to other tasks. CPU 12 subsequently returns to retrieve the reduced (compressed) results from the data RAM 20 of each active memory 14 after the active memories indicate completion of the distributed computational tasks.

Although the present invention and its advantages have been described in detail, it should be understood that various changes, substitutions and alterations can be made herein without departing from the spirit and scope of the invention as defined by the appended claims.

What is claimed is:

1. A method of distributed data processing in a data processing system including a central processing unit coupled to at least one active memory device comprising the steps of:

writing data into a first memory in the active memory device using the central processing unit;

writing control instructions into a second memory in the active memory device using the central processing unit;

performing a first operation on first and second words of data retrieved from the first memory in accordance with control instructions retrieved from the second memory using computing circuitry in the active memory device;

performing a second operation on the result from the first operation and a stored result from a previous operation in accordance with control instructions from the second memory using the computing circuitry in the active memory device;

storing a result from the performance of the second operation in the data memory.

2. The method of claim 1 wherein said steps of performing first and second operations comprise the steps of multiplying the first and second words and adding resulting sum to the stored previous result.

* * * * *